United States Patent
Luoma et al.

(10) Patent No.: US 7,349,357 B1
(45) Date of Patent: Mar. 25, 2008

(54) INTERNET PROTOCOL ADDRESS TO PACKET IDENTIFIER MAPPING

(75) Inventors: Juha-Pekka Luoma, Tampere (FI); Lin Xu, Tampere (FI)

(73) Assignee: Nokia Corporation (FI)

( * ) Notice: Subject to any disclaimer, the term of this patent is extended or adjusted under 35 U.S.C. 154(b) by 1389 days.

(21) Appl. No.: 09/969,297

(22) Filed: Oct. 2, 2001

(51) Int. Cl.
*H04J 1/00* (2006.01)

(52) U.S. Cl. .................. 370/312; 370/392; 370/486; 725/74; 725/98

(58) Field of Classification Search .................. None
See application file for complete search history.

(56) References Cited

U.S. PATENT DOCUMENTS

| | | |
|---|---|---|
| 5,548,340 A | 8/1996 | Bertram |
| 6,188,684 B1 | 2/2001 | Setoyama et al. |
| 6,275,989 B1 | 8/2001 | Broadwin et al. |
| 6,288,738 B1 | 9/2001 | Dureau et al. |
| 6,477,179 B1 | 11/2002 | Fujii et al. |
| 6,523,064 B1 | 2/2003 | Akatsu et al. |
| 6,557,031 B1 * | 4/2003 | Mimura et al. ............. 709/218 |
| 6,961,758 B2 * | 11/2005 | Krishnan ..................... 709/217 |
| 7,039,048 B1 * | 5/2006 | Monta et al. ................ 370/389 |
| 7,089,577 B1 * | 8/2006 | Rakib et al. .................. 725/87 |
| 2002/0024967 A1 * | 2/2002 | Zaun et al. ................. 370/429 |
| 2002/0059614 A1 * | 5/2002 | Lipsanen et al. ............. 725/75 |
| 2002/0131428 A1 * | 9/2002 | Pecus et al. ................. 370/401 |

FOREIGN PATENT DOCUMENTS

| | | |
|---|---|---|
| EP | 1 089 470 A1 | 4/2001 |
| WO | WO 00/65429 | 11/2000 |

OTHER PUBLICATIONS

Handley et al, RFC 2974—Session Announcement Protocol, Oct. 2000, pp. 1-2.*
PCT International Search Report mailed Oct. 14, 2003, (PCT/IB02/04009).
European Telecommunications Standards Institute, "Digital Video Broadcasting (DVB); Specification for Service Information (SI) in DVB Systems", EN 300 468 V1.3.1 (Feb. 1998).
European Telecommunications Standards Institute, "Digital Video Broadcasting (DVB); Implementation Guidelines for the Use of MPEG-2 Systems, Video and Audio in Satellite, Cable and Terrestrial Broadcasting Applications", ETSI TR 101 154 V1.4.1 (Jul. 2000).

* cited by examiner

*Primary Examiner*—Edan Orgad
*Assistant Examiner*—Jung Park
(74) *Attorney, Agent, or Firm*—Banner & Witcoff, Ltd.

(57) ABSTRACT

A digital broadcast (DB) receiver and methods are provided for processing Internet data. The DB receiver receives service identification information mapping a broadcast service component to a unique transmission stream. The DB receiver also receives at least one announcement message mapping an Internet protocol address to a broadcast service component. Using the information, the DB receiver may configure a demultiplexer to filter transmission streams according to an Internet protocol address.

25 Claims, 4 Drawing Sheets

C=DVB SERVICE unicast29.datacast.bbc.com/134 ← 402
a=subnet: IN IP4 10.20.0.0/16 ← 403
a=data-path:forward ← 404
a=framing:dvb/mpe ← 405
a=bearer:dvb-t ← 406

Figure 4 m=nas/radius ← 502
c=TN E.164 312-555-1234 ← 503
a=data-path:return ← 504
a=framing:ppp-asynch ← 505
a=bearer:v.90 ← 506

Figure 5

INTERNET PROTOCOL ADDRESS TO PACKET IDENTIFIER MAPPING

BACKGROUND OF THE INVENTION

1. Field of the Invention

The invention relates to digital broadcasting systems and methods. More particularly, the invention relates to transmitting Internet protocol packets over a digital broadcasting network.

2. Description of Related Art

Conventional digital broadcast (DB) services transmit Internet protocol (IP) data to end-users via transmission streams. Each transmission stream is identified by a packet identifier (PID) that is assigned by a service provider. Unicast IP data and multicast IP data are identified by a limited number of packet identifiers. For example, all unicast IP data may be identified by a single packet identifier and all multicast IP data may be identified by a second packet identifier. The use of a limited number of packet identifiers requires extensive processing by the DB receivers that receive the transmission streams. In particular, when receiving unicast IP data, a DB receiver must process all of the data transmitted under the single or limited number of unicast IP packet identifier. This data includes not only the data addressed to the DB receiver, but also includes data addressed to all or several other DB receivers.

Some proposed solutions to this problem have involved using new protocols to provide digital video services. One drawback of these solutions is that they require modifying the hardware or software components of existing DB receivers.

Therefore, there exists a need in the art for systems and methods for transmitting IP data over DB service networks that require reduced processing by DB receivers and that do not require extensive modifications to existing DB receivers.

BRIEF SUMMARY OF THE INVENTION

The above-mentioned needs in the art are satisfied by the disclosed systems and methods that utilize the mapping of IP addresses to packet identifiers. Transmission streams can be efficiently filtered according to packet identifiers by demultiplexers of DB receivers. Demultiplexers may be implemented with hardware components to reduce the processing requirements of a DB receiver processor or the CPU of a computer.

In a first embodiment, a method of processing Internet protocol packets transmitted by a digital broadcast service is provided. The method includes receiving information assigning each of a plurality of Internet protocol addresses to a unique transmission stream and then receiving a transmission stream. Next, it is determined whether the transmission stream corresponds to a predetermined Internet protocol address. The transmission stream is further processed when the transmission stream corresponds to the predetermined Internet protocol address.

In another embodiment, a method of transmitting Internet data from a digital broadcast service provider is provided. The method includes assigning each of a plurality of Internet protocol addresses to a unique transmission stream. Information is then transmitted to a user identifying the unique transmission stream assigned to each of the Internet protocol addresses. A transmission stream is then transmitted to the user.

In yet another embodiment of the invention, a method of processing Internet protocol packets transmitted by a digital broadcast service is provided. The method includes receiving information assigning a range of Internet protocol addresses that correspond to intended recipients of Internet multicast data to a unique transmission stream and then receiving a transmission stream. It is next determined whether the transmission stream corresponds to the range of Internet protocol addresses and the transmission stream is further processed when the transmission stream corresponds to the range of Internet protocol addresses.

Another embodiment of the invention provides a digital broadcast receiver that identifies Internet protocol data transmitted by a digital video broadcast service using transmission streams identified by unique packet identifiers. The digital broadcast receiver includes a demultiplexer that identifies transmission stream packet identifiers. A memory that contains a plurality of Internet protocol addresses and associated packet identifiers is also included. The digital broadcast receiver also includes a processor programmed with computer-executable instructions to perform the steps comprising: receiving the identification of an Internet protocol address; retrieving from the memory a packet identifier value corresponding to the Internet protocol address; and causing the demultiplexer to identify a transmission stream corresponding to the Internet protocol address.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which:

FIG. 4 illustrates a portion of an announcement message mapping an IP address to a service component in accordance with an embodiment of the invention.

FIG. 5 illustrates a portion of an announcement message that identifies a return path in accordance with an embodiment of the invention.

DETAILED DESCRIPTION OF THE INVENTION

Figure 1:
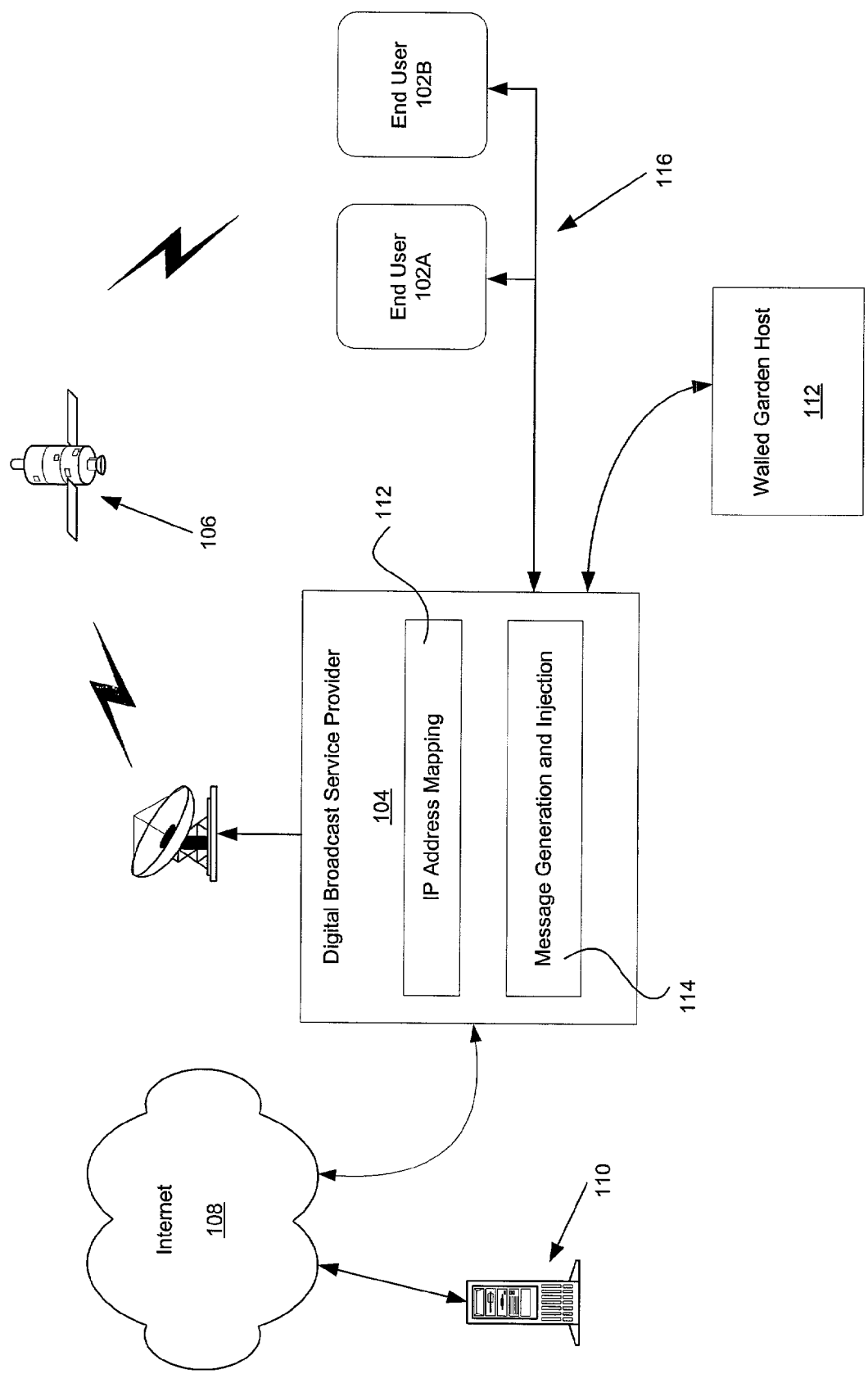
FIG. 1 shows a schematic diagram of a digital video broadcasting system in accordance with an embodiment of the invention.

FIG. 1 shows a schematic diagram of a digital video broadcasting system in accordance with an embodiment of the invention. End users 102A and 102B receive data transmitted by DB service provider 104. DB service provider 104 transmits IP based content (e.g., audio, video, web pages, etc.) along with native audio, data and/or video streams. FIG. 1 shows an embodiment in which the service provider 104 transmits data to end users 102A and 102B via a satellite 106. Of course, service provider 104 may transmit data to end users 102A and 102B via other transmission paths, such as paths that include cable or terrestrial transmitters. The DB transmission path provides a unidirectional, broadband datalink for sending IP data to end users 102A and 102B. End users 102A and 102B may communicate with service provider 104 via a return path 116. Return path 116 may include a telephone network, narrowband datalink, Internet 108 or some other path. Service provider 104 is coupled to the Internet 108. As is well-known, a large number of computers, servers and other devices may be coupled to the Internet 108. FIG. 1 shows a single server 110 coupled to the Internet 108 for illustration purposes. Of course, embodiments of present invention may be used with wide area networks other than the Internet.

Service provider 104 may also be connected to other sources of data, such as walled garden host 112. Unlike communicating with the Internet 108, end users 102A and 102B can only communicate with walled garden host 112 via service provider 104.

In addition to transmitting conventional video broadcast data to end users, service provider 104 includes modules for efficiently transmitting IP packets to end-users. An IP address mapping module 112 maps IP addresses to DB service components in a manner that is described in detail below. A message generation and injection module 114 generates messages that contain the information mapping IP addresses to DB service components and injects the messages into signals broadcasted by service provider 104.

Figure 2:
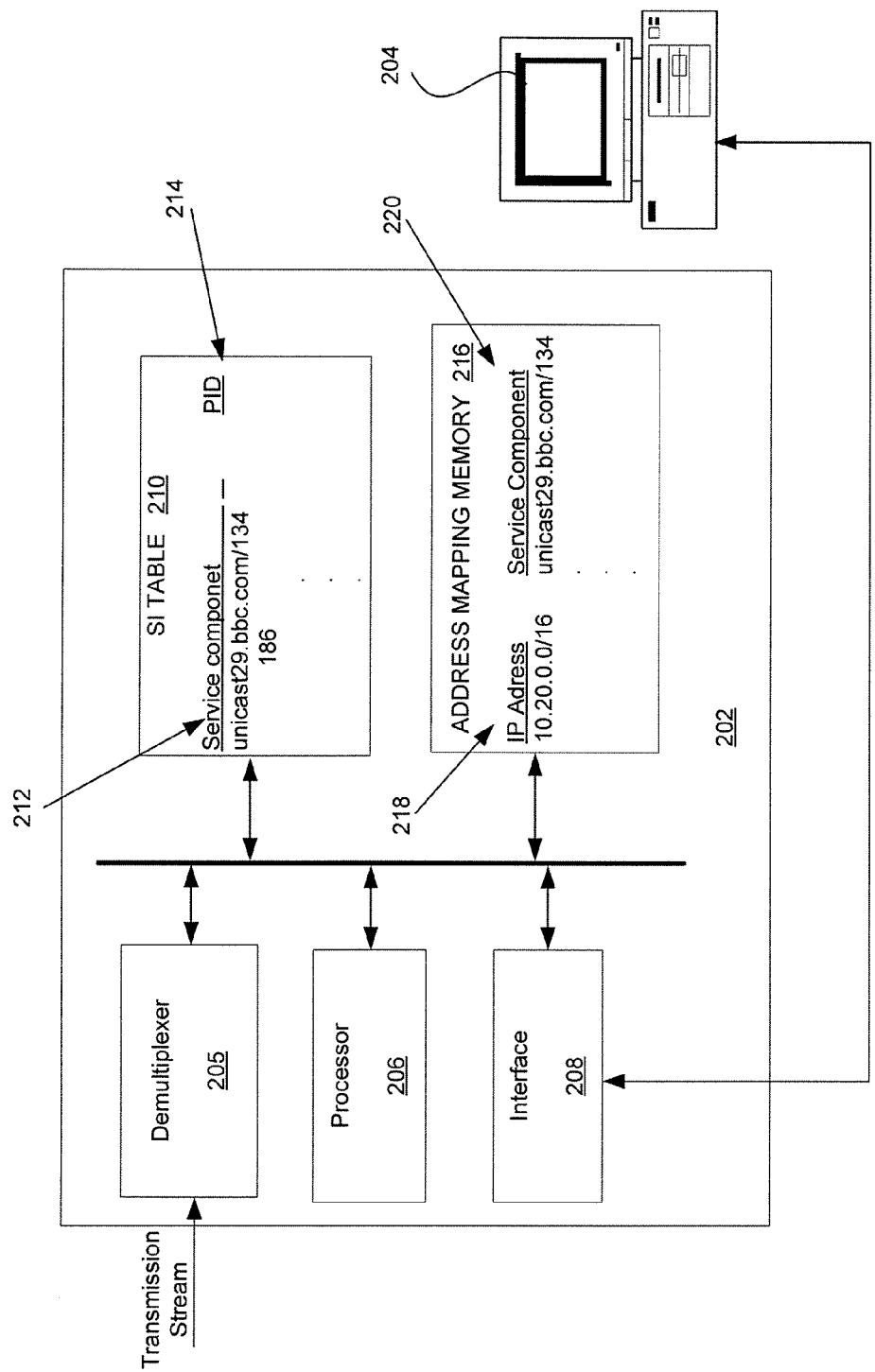
FIG. 2 illustrates end user equipment in accordance with an embodiment of the invention.

FIG. 2 illustrates a DVB receiver 202 and a computer device 204 in accordance with an embodiment of the invention. A demultiplexer 205 receives and filters transport stream packets. Filtering may be performed based on the transport stream packet identifier used to identify each service component. A processor 206 is included for controlling the operation of demultiplexer 205 and the other components included within receiver 202. An interface 208 may be included in embodiments in which receiver 202 is coupled to a computer device 204.

Receiver 202 also includes a database 210 that includes DB service information (SI). In particular, database 210 includes a table mapping DB service components 212 to transmission stream packet identifiers 214. The mapping of IP addresses to packet identifiers may be part of an SI table that contains other service information.

An address mapping memory 216 may be included to store information from announcement messages mapping IP addresses 218 to DB service components 220. In one embodiment, such messages are broadcasted by service provider 104 using the session announcement protocol (SAP). Messages may be sent in other formats, such as the extensible markup language (XML) format or the Internet control message protocol (ICMP) format. Messages may be delivered using the IP over multiprotocol encapsulation DB data broadcasting profile. Messages mapping IP addresses to DB service components may be delivered on the highest component tag of each DB service that includes IP data components to allow end user equipment to easily locate the messages. Utilizing an SI table and announcement messages to map IP address to packet identifiers allows the disclosed mapping technique to be implemented with a wide variety of existing devices, such as conventional DB receivers. Database 210 and address mapping memory 216 may be implemented with a single memory module.

In operation, receiver 202 may be configured to filter and transmit IP data to computer 204. Computer 204 may have a static or dynamic IP address. Receiver 202 may identify a service component corresponding to the IP address of computer 204 by analyzing the information in address mapping memory 216. The packet identifier of a corresponding transmission stream may then be determined by analyzing the information in SI table 210. Then, demultiplexer 205 may be configured to filter transmission streams according to packet identifier values. Transmission streams that contain IP data addressed to computer 204 may be transmitted to computer 204 via interface 208.

Figure 3:
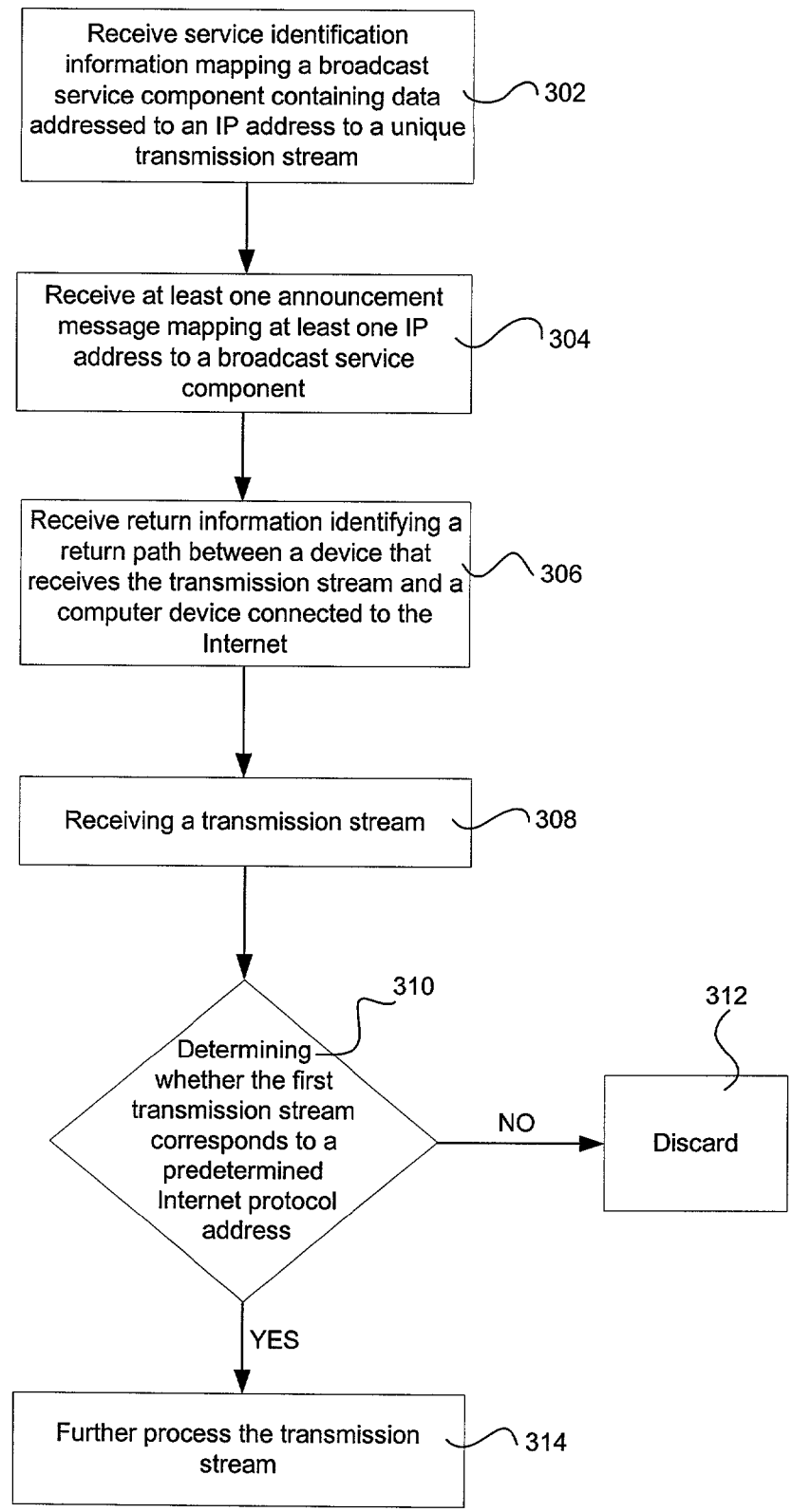
FIG. 3 illustrates a method of processing Internet protocol packets with a DB receiver in accordance with an embodiment of the invention.

FIG. 3 illustrates a method of mapping IP addresses to packet identifiers and transmitting the information to broadcast receivers in accordance with an embodiment of the invention. In step 302, a DB receiver receives service identification information mapping a broadcast service component containing data addressed to an IP address to a unique transmission stream. Each transmission stream may be identified by a unique identifier, such as a packet identifier. Step 302 may be performed when a DB receiver is initialized at startup, during handover from one DB transmitter to another DB transmitter, periodically during updates or at other times. In step 304, the DB receiver receives at least one announcement message mapping at least one IP address to a broadcast service component. Step 304 may be performed when the DB receiver requests the service, periodically during updates, during handover from one DB transmitter to another DB transmitter or at other times. The DB receiver may use the service identification information and the information from the announcement message to map IP addresses to packet identifiers in the manner described below.

In step 306, the receiver may receive return information identifying a return path between the receiver and a computer device connected to the Internet. Step 306 may be performed when the DB receiver desires to utilize a return path, during handover from one DB transmitter to another DB transmitter or at other times. In one embodiment of the invention, the return information is transmitted to the DB receiver via the DB network. In another embodiment, the return information is received when the DB service provider transmits electronic mail messages to an end user via a mail server. The return information may identify a protocol, a return path, a telephone number, an authentication requirement or other information that allows a recipient of the transmission stream to reply to a source. An Internet address may also be identified for the return channel, instead of or in addition to the telephone number. In embodiments that utilize an Internet address, the receiver may use an Internet Service Provider (ISP) to connect to the Internet (e.g. via the PSTN or a GSM network), then set up a return channel connection via the Internet. In some embodiments, an Internet address and a phone number may be provided. The phone number may correspond to a preferred ISP to use for the return path.

A transmission stream is received in step 308. It is next determined whether the transmission stream corresponds to a predetermined Internet protocol address in step 310. The predetermined IP address may correspond to an address of a DB receiver, an address assigned to a computer coupled to a DB receiver, an address of a computer that is not coupled to a DB receiver, or an address of another device. In one embodiment of the invention, the determination includes comparing the packet identifier of the transmission stream to information contained in a service information table and to information in at least one announcement message.

When the transmission stream does not correspond to the predetermined IP address, the transmission stream is discarded in step 312. When the transmission stream does correspond to the predetermined IP address, the transmission stream may be further processed by the DB receiver or a computer device in step 314.

The present invention may also be used in connection with multicast data. For example, a range of IP addresses in which each address corresponds to a multicast IP group may be mapped to a DB service component. The software running on a DB receiver, an attached computer or other device can configure the receiver to receive any number of multicast groups. A DB receiver may then compare the packet identifiers associated with received transmission streams to information mapping IP addresses to packet identifiers. The information mapping IP addresses to packet identifiers may be contained in a service information table and one or more announcement messages.

Announcement messages mapping IP address to DB service components may be sent to DB receivers using IP over multiprotocol encapsulation (IP/MPE). IP over multiprotocol encapsulation is conventionally used for transmitting IP packets over DB networks. The announcement messages may contain fields for identifying information such as the data path, bearer, framing, network access service and subnet. The data path field may identify whether the transmission path is a forward path or a return path. The bearer field may identify the type of DB network used to transmit the transmission stream. The framing field may be used identify the manner which the IP packets are encapsulated by the DB service provider or the manner in which data is sent on a return data path. A network access service field may be included to identify protocol used for identifying users, such as RADIUS, Diameter, IPsec, L2TP or PPTP, or to indicate that the user will be prompted for username and password as an identification. The subnet field may contain the IP network address and the length (in bits) of the IP subnet mask.

FIG. 4 illustrates an exemplary portion of a SAP announcement message used to announce a unicast transmission without a return path. Line 402 defines the DB service component as "unicast29.datacast.bbc.com/134." Line 403 indicates that the DB service component carries data addressed to the IP network 10.20.0.0/16. Lines 404 and 405 indicate that the data path is a forward data path that uses DB multiprotocol encapsulation. Line 406 identifies the network as a terrestrial DB network.

Information from the SAP message shown in FIG. 4 may be stored in address mapping memory 216. The information allows DVB receiver 202 to associate DVB service component "unicast29.datacast.bbc.com/134" with IP network address "10.20.0.0/16." DVB receiver 202 can then utilize the information contained in SI table 210 to determine that particular packet identifier 186 is assigned to DVB service component "unicast29.datacast.bbc.com/134." Demultiplexer 205 may then be configured to pass transmission streams having a packet identifier value of 186.

FIG. 5 illustrates an exemplary portion of a SAP message that includes return path information. Line 502 indicates that the RADIUS protocol is used to authenticate users. Line 503 indicates that the return data path is via a telephone network and the phone number is (312)-555-1234. Lines 504-506 identify the data path as a return data path that uses asynchronous PPP over a V.90 modem link. Of course, additional or alternative information may be included. For example, in embodiments in which the SAP message identifies a phone number and Internet address for the return path, a line such as "c=IN IP4 130.230.1.66" may be included to identify the Internet address and the phone number may correspond to a preferred ISP.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, aspects of the present invention may be used with digital audio broadcast services and other digital video systems.

We claim:

1. A method comprising:
receiving information assigning each of a plurality of Internet protocol addresses to a unique transmission stream comprising:
receiving service identification information mapping a broadcast service component to a unique transmission stream; and
receiving at least one announcement message mapping at least one Internet protocol address to a broadcast service component;
receiving a transmission stream;
determining whether the transmission stream corresponds to one of the plurality of assigned Internet protocol addresses comprising:
identifying a packet identifier used to identify the transmission stream; and
comparing the packet identifier to a list of packet identifiers and associated Internet protocol addresses; and
further processing the transmission stream when the transmission stream corresponds to the one Internet protocol address.

2. The method of claim 1, wherein each transmission stream is identified by a unique packet identifier.

3. The method of claim 1, wherein the at least one announcement message is received on the highest component tag of a broadcast service component that includes Internet protocol data.

4. The method of claim 3, wherein the at least one announcement message is in the session announcement protocol format.

5. The method of claim 3, wherein the at least one announcement message is in the extensible markup language format.

6. The method of claim 3, wherein the at least one announcement message is in the Internet control message protocol format.

7. The method of claim 1, wherein the one Internet protocol address comprises an Internet protocol address of a digital video broadcast receiver.

8. The method of claim 1, wherein the one Internet protocol address comprises an Internet protocol address of a computer device.

9. The method of claim 1, wherein the one Internet protocol address comprises an Internet protocol address of a multicast group.

10. The method of claim 1, further comprising the step of:
receiving return information identifying a return path between a device that receives the transmission stream and a computer device connected to the Internet.

11. The method of claim 10, wherein the return information includes the identification of a protocol.

12. The method of claim 10, wherein the return information includes the identification of a telephone number, an Internet protocol address or both.

13. The method of claim 12, further including the step of transmitting data through the return path to a device connected to the Internet.

14. A method comprising:
assigning each of a plurality of Internet protocol addresses to a unique transmission stream comprising:

transmitting service identification information mapping a broadcast service component to a unique transmission stream; and transmitting at least one announcement message mapping at least one Internet protocol address to a broadcast service component, wherein the at least one announcement message is transmitted on the highest component tag of a broadcast service component that includes Internet protocol data, and wherein the at least one announcement message is in the session announcement protocol format;

transmitting information identifying the unique transmission stream assigned to each of the Internet protocol addresses; and transmitting the transmission stream.

15. A method comprising:

receiving information assigning a range of Internet protocol addresses that correspond to intended recipients of Internet multicast data to a unique transmission stream comprising:

receiving service identification information mapping a broadcast service component to a unique transmission stream; and receiving at least one announcement message mapping the range of Internet protocol addresses to a broadcast service component;

receiving a transmission stream;

determining whether the transmission stream corresponds to the range of Internet protocol addresses by comparing a packet identifier of the transmission stream to the service identification information and the at least one announcement message associated with the range of Internet protocol addresses; and further processing the transmission stream when the transmission stream corresponds to the range of Internet protocol addresses.

16. The method of claim 15, wherein the at least one announcement message is received on the highest component tag of a broadcast service component that includes Internet protocol data.

17. The method of claim 16, wherein the at least one announcement message is in the session announcement protocol format.

18. The method of claim 16, wherein the at least one announcement message is in the Internet control message protocol format.

19. An apparatus comprising:

a demultiplexer configured to identify transmission stream packet identifiers;

a service identification database that associates each of a plurality of service components to transmission stream packet identifiers;

a message memory that contains information associating at least one internet protocol address to a unique service component; and a processor programmed with computer-executable instructions configured to perform:

receiving the identification of an Internet protocol address;

retrieving from the service identification database and the message memory a packet identifier value corresponding to the Internet protocol address;

causing the demultiplexer to identify a transmission stream corresponding to the Internet protocol address; and causing the apparatus to transmit the transmission stream corresponding to the Internet protocol address.

20. A computer readable-medium containing computer-executable instructions configured for causing a digital receiver to perform:

receiving information assigning each of a plurality of Internet protocol addresses to a unique transmission stream comprising:

receiving service identification information mapping a broadcast service component to a unique transmission stream; and receiving at least one announcement message mapping at least one Internet protocol address to a broadcast service component;

receiving a transmission stream;

determining whether the transmission stream corresponds to one of the plurality of Internet protocol addresses by comparing a packet identifier of the transmission stream to the service identification information and the at least one announcement message associated with at least one of the plurality of Internet protocol addresses; and further processing the transmission stream when the transmission stream corresponds to the one Internet protocol address.

21. A method comprising:

receiving information assigning each of a plurality of Internet protocol addresses to a unique transmission stream comprising:

receiving service identification information mapping a broadcast service component to a unique transmission stream; and receiving at least one announcement message mapping at least one Internet protocol address to a broadcast service component, wherein the at least one announcement message is received on the highest component tag of a broadcast service component that includes Internet protocol data, and wherein the at least one announcement message is in the session announcement protocol format;

receiving a transmission stream;

determining whether the transmission stream corresponds to one of the plurality of assigned Internet protocol addresses; and further processing the transmission stream when the transmission stream corresponds to the one Internet protocol address.

22. A method comprising:

receiving information assigning a range of Internet protocol addresses that correspond to intended recipients of Internet multicast data to a unique transmission stream comprising:

receiving service identification information mapping a broadcast service component to a unique transmission stream; and receiving at least one announcement message mapping the range of Internet protocol addresses to a broadcast service component, wherein the at least one announcement message is received on the highest component tag of a broadcast service component that includes Internet protocol data, and wherein the at least one announcement message is in the session announcement protocol format;

receiving a transmission stream;

determining whether the transmission stream corresponds to the range of Internet protocol addresses; and further processing the transmission stream when the transmission stream corresponds to the range of Internet protocol addresses.

23. A method comprising:
receiving information assigning each of a plurality of Internet protocol addresses to a unique transmission stream comprising:
 receiving service identification information mapping a broadcast service component to a unique transmission stream; and
 receiving at least one announcement message mapping at least one Internet protocol address to a broadcast service component;
receiving a transmission stream;
determining whether the transmission stream corresponds to one of the plurality of assigned Internet protocol addresses by comparing a packet identifier of the transmission stream to the service identification information and the at least one announcement message associated with at least one of the plurality of Internet protocol addresses; and
further processing the transmission stream when the transmission stream corresponds to the one Internet protocol address.

24. An apparatus comprising:
a processor; and
a memory in communication with the processor, the memory containing computer-executable instructions configured to cause the processor to perform:
 receiving information assigning each of a plurality of Internet protocol addresses to a unique transmission stream comprising:
  receiving service identification information mapping a broadcast service component to a unique transmission stream; and
  receiving at least one announcement message mapping at least one Internet protocol address to a broadcast service component;
 receiving a transmission stream;
 determining whether the transmission stream corresponds to one of the plurality of assigned Internet protocol addresses by comparing a packet identifier of the transmission stream to the service identification information and the at least one announcement message associated with at least one of the plurality of Internet protocol addresses; and
 further processing the transmission stream when the transmission stream corresponds to the one Internet protocol address.

25. An apparatus comprising:
a processor; and
a memory in communication with the processor, the memory containing:
 information assigning each of a plurality of Internet protocol addresses to a unique transmission stream comprising:
  first information mapping a broadcast service component to a unique transmission stream, and
  second information mapping at least one Internet protocol address to a broadcast service component; and
 computer-executable instructions configured to cause the processor to perform:
  receiving a transmission stream;
  determining whether the transmission stream corresponds to one of the plurality of assigned Internet protocol addresses by comparing a packet identifier of the transmission stream to the first information and the second information associated with at least one of the plurality of Internet protocol addresses; and
  further processing the transmission stream when the transmission stream corresponds to the one Internet protocol address.

\* \* \* \* \*

UNITED STATES PATENT AND TRADEMARK OFFICE
CERTIFICATE OF CORRECTION

PATENT NO.            : 7,349,357 B1                                              Page 1 of 1
APPLICATION NO. : 09/969297
DATED                    : March 25, 2008
INVENTOR(S)          : Juha-Pekka Luoma et al.

It is certified that error appears in the above-identified patent and that said Letters Patent is hereby corrected as shown below:

In Column 6, Claim 10, Line 53:
    Please delete "the step of"

Signed and Sealed this

Sixth Day of January, 2009

JON W. DUDAS
*Director of the United States Patent and Trademark Office*